March 1, 1927. 1,619,717
R. W. GEARHART
MANUFACTURING, HARDENING, STORING, AND DISPENSING PLANT FOR
ICE CREAM AND OTHER FROZEN FOOD PRODUCTS
Filed May 22, 1925 2 Sheets-Sheet 1
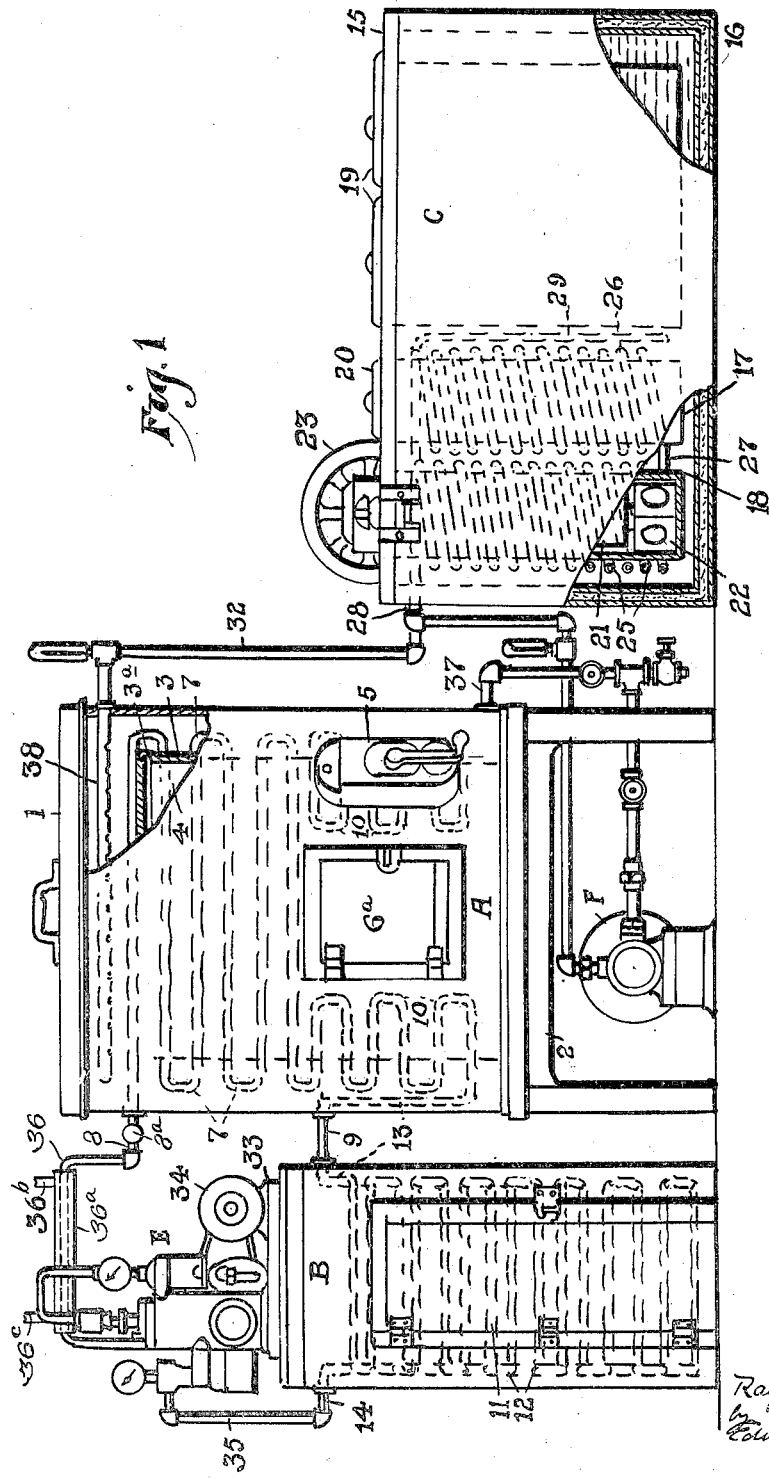

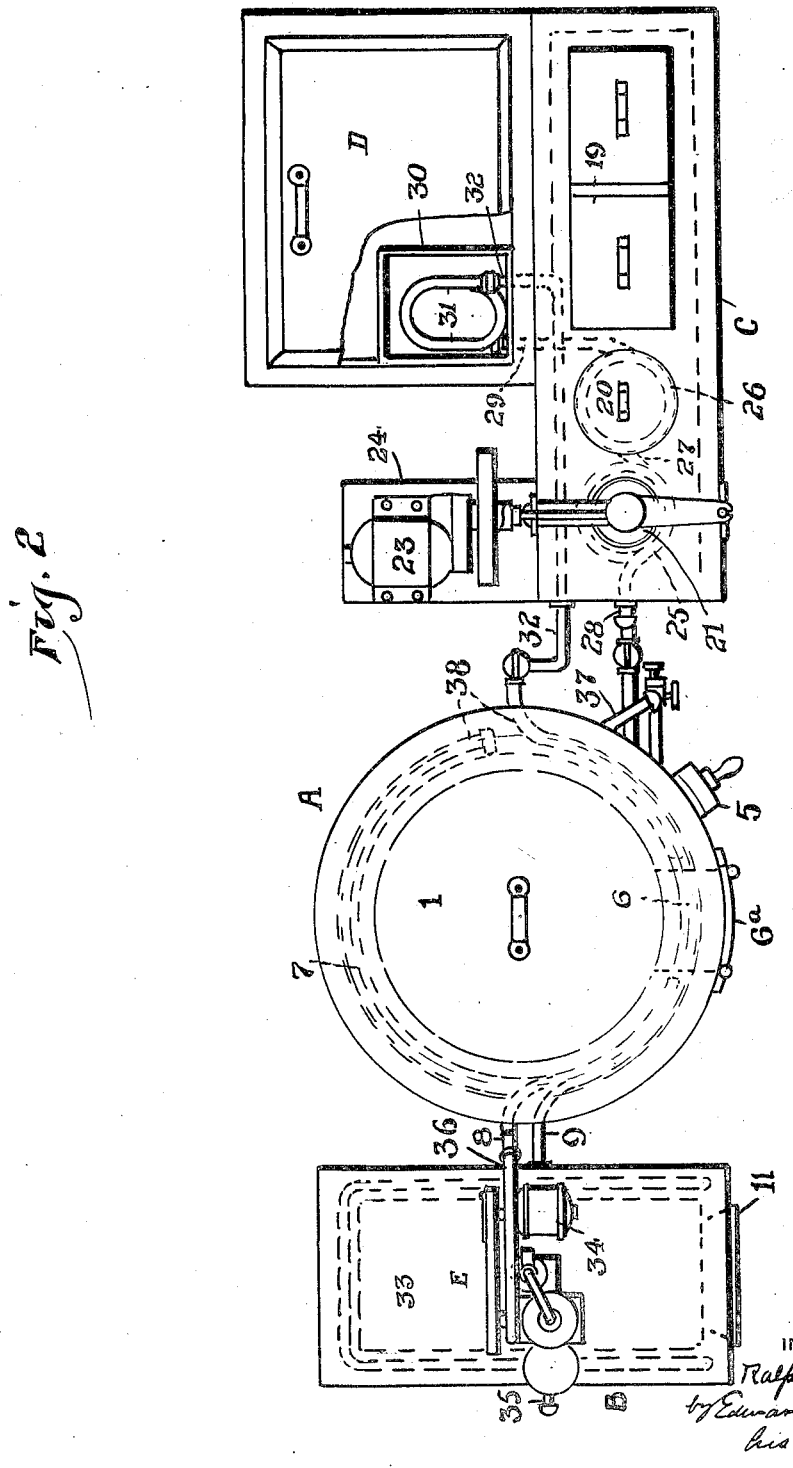

Patented Mar. 1, 1927.

1,619,717

UNITED STATES PATENT OFFICE.

RALPH W. GEARHART, OF CLEARFIELD, PENNSYLVANIA, ASSIGNOR TO GEARHART SALES CABINET CO. INC., OF CLEARFIELD, PENNSYLVANIA, A CORPORATION OF DELAWARE.

MANUFACTURING, HARDENING, STORING, AND DISPENSING PLANT FOR ICE CREAM AND OTHER FROZEN FOOD PRODUCTS.

Application filed May 22, 1925. Serial No. 32,067.

The purpose which I have in view is the provision of a compact, inexpensive yet efficient mechanism, economical to operate, which will be suited for use by small manufacturers of frozen food products, and by dispensers and retailers of such products.

Ice cream and other frozen food products are frozen by the "freezing" operation to a more or less slushy or semi-solid state, and must be "hardened" before they are fit for consumption.

In large commercial factories, hardening rooms are provided into which the freezer cans are taken from the freezers, but such equipment is beyond the reach of most small factories, direct dispensers or retailers.

Where dispensers and retailers, such as restaurants, hotels, drug and confectionery stores procure their ice cream and similar products from commercial manufacturers, the products are delivered in cans which are packed in tubs with ice and salt, and the goods must be repacked at more or less frequent intervals to keep them in servable or salable condition.

The object which I have in view is the provision of a compact and relatively inexpensive unitary mechanism or plant which will enable hotels, restaurants, drug stores, confectionery stores and other relatively small establishments to economically and satisfactorily manufacture, harden, store and dispense either for immediate consumption or at retail, ice cream and other frozen food products.

This not only enables the concern to advertise the products as their own manufacture, but does away with the inconvenient and uncleanly methods of packing and repacking the products in ice and salt which are objectionable in such a place of business.

For these purposes, I have invented a new and improved unitary structure or plant which is comprised of means for freezing, hardening, storing and dispensing frozen food products.

The invention also consists in the arrangement and combinations of the elements, and also in the sub-combinations hereinafter described.

Other novel features of construction, and also arrangement of parts will appear from the following description.

In the accompanying drawings, Fig. 1 is a side elevation of a plant embodying the principles of my present invention, certain of the internal parts being shown in dotted lines for the sake of clearness, and Fig. 2 is a plan view of the same. Portions of the views are also cut away to show internal parts.

In the drawings A represents a dispensing cabinet, the same being shown as of the rotary container type which is the subject matter of Letters Patent of the United States No. 1,432,284, granted to me on October 17, 1922. The construction of this cabinet is described in said Letters Patent, and therefore is not shown or described in detail herein.

However the cabinet is shown of circular form and provided with a removable top closure 1. It is preferably mounted on the raised base or stand 2. 3 is an annular partition in said cabinet extending upwardly from the floor and spaced inwardly from the outer wall of the cabinet to form an annular refrigerant chamber. The upper end of the partition is provided with a removable lid 3ª. Within the annular partition 3 is mounted the container 4 rotatable on a vertical axis, means, indicated generally at 5, being provided to bring the proper compartment in said container in registration with the tunnel doorway 6 which extends from without the cabinet into the space within the annular wall 3, and which doorway is provided with the tightly fitting door 6ª.

The annular space between the partition 3 and the outer wall of the cabinet A is occupied by the cylindrical pipe-coil 7 whose upper end is connected to without the casing 1 by the pipe 8 and its lower end by the pipe 9. The coil 7 is provided at either side of the doorway 6 with the vertical connecting pipes 10 so as to make return bends in the coil, as shown in dotted lines.

The goods such as packages of ice cream and other frozen food products are stored in the compartment of the container 4, and access to the proper compartment for the removal of goods may be had by rotating the container into such position that the selected compartment is opposite the doorway 6 and then opening the doorway.

B represents a hardening cabinet which is shown constructed in accordance with my invention which is the subject matter of my companion patent application Serial No. 32,065, filed on even date herewith.

As shown said cabinet is provided with a door 11 for access to its contents and is provided in its interior with a pipe coil 12 whose upper end is connected to without the cabinet by the pipe 13 and while its lower end is similarly connected to without the cabinet by the pipe 14 which extends up within the cabinet and then horizontally through the wall thereof, as shown.

The cabinet B is employed for hardening the ice cream or other products which come from the freezer in a more or less slushy or semi-solid form and must be hardened before they are ready for dispensing or storage.

C represents a cabinet having heat insulated walls and containing a bath of brine. The cover 15 of the cabinet C is provided with apertures from which depend containers having closed bottoms spaced above the floor of the bath. Thus 16 is a relatively large and preferably rectangular container which may be used to store the frozen food products or other articles or substances requiring refrigeration. 17 and 18 are cylindrical containers depending from other apertures in the cover 15.

The container 16 is closed by the twin-lids 19 which fit the aperture in the cover 15, while a circular lid 20 closes the aperture from which the container 17 depends. The container 18 has the freezer can 21 rotatably mounted therein and supported on a block 22 placed in the bottom of the container. The freezer can is rotarily-driven by the motor 23 mounted on the support 24 which may be a shelf extending laterally from the cabinet C.

The containers 18 and 17 are surrounded with the brine bath by the helical pipe-coils 25 and 26, respectively, the two coils being connected together at their lower ends by the connection 27. The upper end of the coil 25 is connected to without the cabinet C by the pipe 28 while the pipe 29 is connected to the upper end of the coil 26, and leads downwardly in the cabinet C and thence out through the wall of said cabinet.

Ice cream and other food products are frozen in the container 18 and the freezer can may be lifted over into the container 17 and a fresh batch frozen in the freezer. If desired both containers 18 and 17 may be employed for freezing. The compartment 16 may be employed for storing cans of frozen product and for other refrigerating purposes.

D is a cold-storage box adjacent to the cabinet C and shown provided with a hinged cover. In one portion of the interior of said box is a brine tank or compartment 30 in which is contained the pipe-coil 31 whose lower end is connected to the pipe 29 while its upper end is connected to a pipe 32 which extends into the cabinet C and out through the end of the latter.

E is a compressor for ammonia or some other suitable refrigerant, which is preferably mounted on a platform 33 on top of the hardening cabinet B, and driven by a motor 34. The intake pipe 35 of the said compressor is connected to the outlet pipe 14 of the hardening cabinet B, while the outlet pipe 36 of said compressor is connected to the connecting pipe 8 of the coil 7 of the dispensing cabinet A. $36^a$ is a water jacket having inlet pipe $36^b$ and outlet pipe $36^c$ and which surrounds the pipe 36 and acts as a condenser. The pipe 8 is provided with an expansion valve $8^a$. The end 13 of the hardening cabinet coil 12 is connected to the pipe 9 which is connected to the lower end of the coil 7 of the dispensing cabinet A.

Thus the refrigerant first expands in the coil 7 and then in the coil 12, thence returning to the compressor.

F is a brine pump, which may be mounted under the stand 2. The intake of the pump F is connected to a drain pipe 37 connected to the bottom of the annular chamber formed by the partition 3 and the outer wall of the cabinet A, while the discharge of pump F is connected to the pipe 28 communicating with the upper end of the coil 25. The pipe 32 which connects with the lower end of the brine coil 31, extends through the upper side wall of the cabinet A and is connected to a circular perforated spray pipe 38 which is located in the upper part of said cabinet above the annular refrigerant chamber thereof.

It is evident that the brine from the pump F is first pumped through the coil 25, thence through the coil 26, thence through the coil 31 and then sprayed down within the cabinet A over the refrigerant coils 7 collecting in the bottom of the cabinet and thence returning to the pump F.

It is evident that the brine is thus being continuously refrigerated after passing through the coils 25 and 26 of the box C, thus providing for the freezing of the products and their storage, and thence passing through the coil 31 of the cold storage box D, its temperature being still sufficiently low to properly refrigerate the contents of said box, and thence it is rechilled by being dripped over the coils 7 in the cabinet A, and thence returned to the pump.

It is evident from the foregoing that my improved apparatus provides a complete, compact and efficient plant for the purposes described.

What I desire to claim is:—

1. In a unitary apparatus for the purpose described, the combination of a pair of cabinets, one of said cabinets being provided with a bath of brine, a brine coil in said bath, an expansion coil in the other cabinet, a compressor-condenser mechanism in circuit with the expansion coil, a pump having its discharge connected to one end of said brine coil, and means interposed between the other end of said brine coil and the intake of said pump whereby the brine for said brine coil is refrigerated by said expansion coil.

2. In a unitary apparatus for the purpose described, the combination of a pair of cabinets, one of said cabinets being provided with a bath of brine, a brine coil in said bath, an expansion coil in the other cabinet, a compressor-condenser mechanism in circuit with the expansion coil, a pump having its discharge connected to one end of said brine coil, and means interposed between the other end of said brine coil and the intake of said pump whereby the brine for said brine coil is dripped over said expansion coil.

3. In a unitary apparatus for the purpose described, the combination of a refrigerating cabinet and a freezer cabinet, said second cabinet containing a bath of brine, an expansion coil in said refrigerating cabinet, a compressor-condenser mechanism in circuit with said expansion coil, a brine coil in said bath, means for circulating brine through said coil and in contact with said expansion coil.

4. In a unitary apparatus for the purpose described, the combination of a dispensing cabinet and a hardening cabinet, expansion coils connected in series in said cabinets, a compressor-condenser mechanism in circuit with said expansion coils, a second pair of refrigerating cabinets, brine coils in series in said second pair of cabinets, a pump in circuit with said brine coils, and means interposed in the brine circuit for chilling the brine by contact with a portion of the expansion circuit.

5. In a unitary apparatus for the purpose described, the combination of a dispensing cabinet and a hardening cabinet, expansion coils connected in series in said cabinets, a compressor-condenser mechanism in circuit with said expansion coils, a second pair of refrigerating cabinets, brine coils in series in said second pair of cabinets, a pump in circuit with said brine coils, and means interposed in the brine circuit for chilling the brine by contact with the expansion coil in one of the first named pair of cabinets.

6. In a unitary apparatus for the purpose described, the combination of a dispensing cabinet and a hardening cabinet, expansion coils connected in series in said cabinets, a compressor-condenser mechanism in circuit with said expansion coils, a second pair of refrigerating cabinets, brine coils in series in said second pair of cabinets, a pump in circuit with said brine coils, and means interposed in the brine circuit for chilling the brine by contact with the expansion coil in said dispensing cabinet.

7. In a plant for the purpose described, the combination of a cabinet, an expander coil for a refrigerant in said cabinet, a second cabinet containing a bath of brine, coils in said second cabinet, and a brine circuit, including a pump in which said second named coils are included, brine drip means in the upper portion of said first cabinet connected to the discharge end of said brine circuit, and means whereby the brine from the drip is drawn from the bottom of the first cabinet into said brine circuit.

Signed at Clearfield, Pa., this 25th day of April, 1925.

RALPH W. GEARHART.